United States Patent [19]

Brandenburg et al.

[11] Patent Number: 5,234,607

[45] Date of Patent: Aug. 10, 1993

[54] WET OXIDATION SYSTEM STARTUP PROCESS

[75] Inventors: Bruce L. Brandenburg; Richard W. Lehmann, both of Rib Mountain; Gene W. Mueller, Easton, all of Wis.; Kenneth P. Keckler, Broadview Heights, Ohio

[73] Assignee: Zimpro Passavant Environment Systems Inc., Rothschild, Wis.

[21] Appl. No.: 872,200

[22] Filed: Apr. 22, 1992

[51] Int. Cl.⁵ .............................................. C02F 1/72
[52] U.S. Cl. ................................................... 210/761
[58] Field of Search ................ 210/761, 766, 758, 462

[56] References Cited

U.S. PATENT DOCUMENTS

| | | | |
|---|---|---|---|
| 4,141,829 | 2/1979 | Thiel et al. | 210/761 |
| 4,369,115 | 1/1983 | Bauer | 210/761 |
| 4,384,959 | 5/1983 | Bauer et al. | 210/739 |
| 4,395,339 | 7/1983 | Chowdhury et al. | 210/761 |
| 4,853,136 | 8/1989 | Roussel et al. | 210/761 |
| 5,057,231 | 10/1991 | Mueller et al. | 210/761 |

Primary Examiner—Stanley S. Silverman
Assistant Examiner—Neil M. McCarthy
Attorney, Agent, or Firm—Tipton L. Randall

[57] ABSTRACT

The invention is a process for starting up a wet oxidation system using essentially pure oxygen for oxidation of a concentrated wastewater. Flow of startup water and air is established through the wet oxidation system at an elevated temperature and pressure. An incremental increase in flow of oxygen and wastewater to the system commences while simultaneously an incremental decrease in flow of startup water and air occurs, raising system temperature in a controlled fashion. The incremental changes in flows are repeated until the wastewater and pure oxygen have reached about 100 percent of selected operating flows, the startup water and air flows have decreased to zero, and the system has attained the selected operating temperature, while maintaining a selected oxygen residual in the offgases.

12 Claims, 1 Drawing Sheet

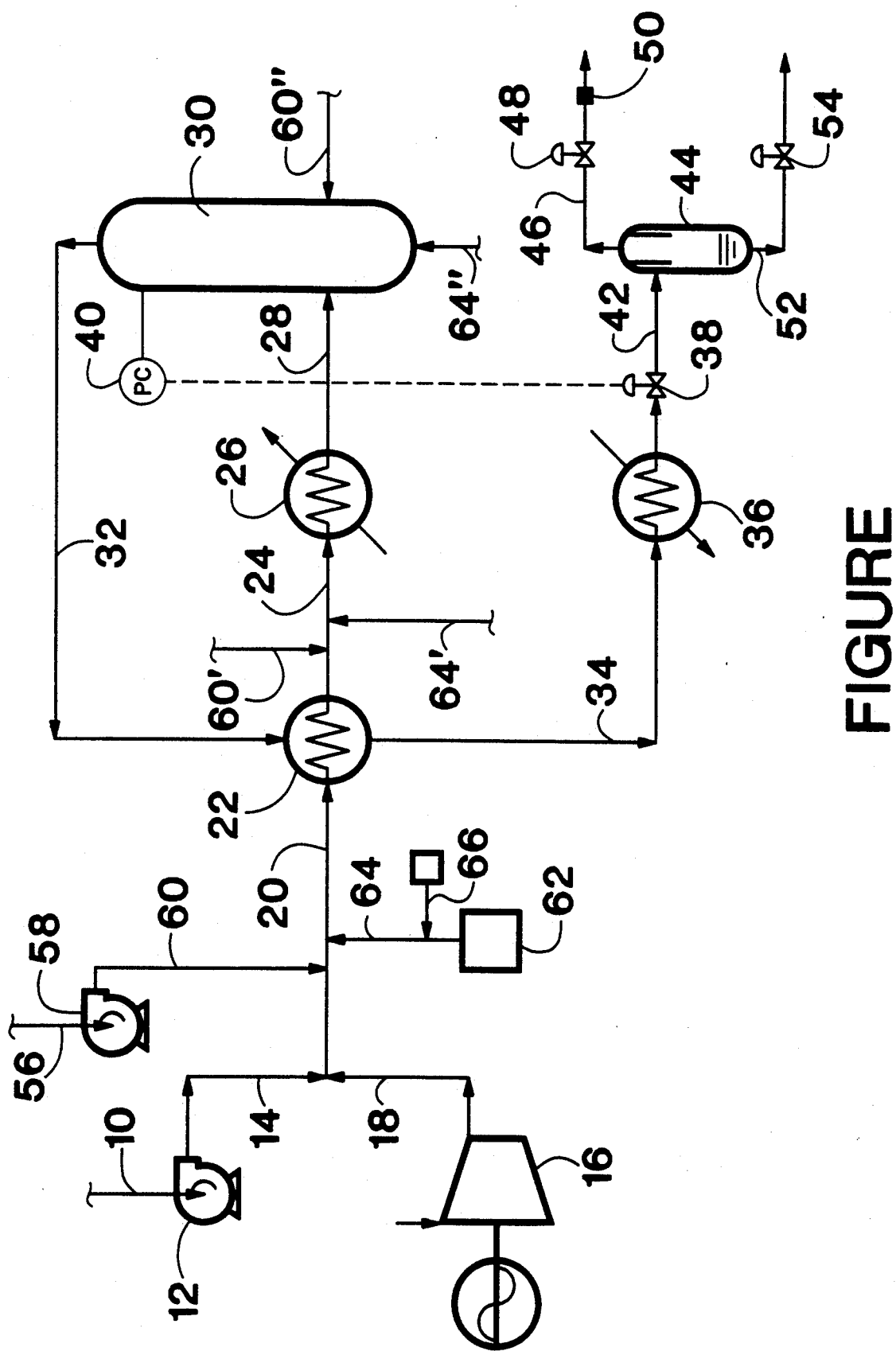
FIGURE

WET OXIDATION SYSTEM STARTUP PROCESS

BACKGROUND OF THE INVENTION

1. Field of the Invention

This invention relates to a process for starting up a wet oxidation system using essentially pure oxygen or oxygen enriched air for oxidation of a concentrated wastewater.

2. Information Disclosure Statement

The removal of pollutants from wastewaters by wet oxidation is a well known method of wastewater treatment. Pollutants are oxidized by oxygen from an oxygen containing gas in a closed system at elevated temperatures and pressures.

Operating temperatures range from 100° C. (212° F.) to 373° C. (703° F.) with pressures sufficient to retain water in a liquid state plus supply sufficient oxygen containing gas for oxidation of the pollutants. The system pressure typically ranges from about 100 psig (690 KPa) at lower temperatures to about 4,000 psig (27,578 KPa) at the higher temperatures.

An overall measure of pollutant content of wastewaters is Chemical Oxygen Demand (COD), the weight of oxygen needed to oxidize the pollutants in a unit volume of wastewater. COD is usually measured in units of grams per liter. The objective of wet oxidation generally is to remove as much COD as possible from the wastewater. COD removals of 85% to 99+% can be attained at the higher oxidation temperatures.

The start up of wet oxidation systems treating dilute liquid wastes with a COD of about 10 g/l or less with air, oxygen enriched air or essentially pure oxygen gas can be accomplished without difficulty. The pressurized liquid and gaseous phases are mixed and heated, flow through a reactor vessel, are cooled, depressurized and then separated into an oxidized liquid phase effluent and a noncondensed offgas phase. The heat generated by the oxidation of the dilute waste is not so great as to cause control problems when raising the temperature of waste and oxygen containing gas from ambient to the selected wet oxidation temperature.

Wet oxidation of more concentrated liquid wastes, with COD in excess of about 10 g/l, using essentially pure oxygen gas or high oxygen content gas produces potentially difficult to control situations, particularly when starting up the wet oxidation system. The large amount of heat liberated on wet oxidation of the concentrated wastes with high oxygen content gas makes system startup and operation most difficult to control. Well developed operating procedures are required for such a wet oxidation system. Bauer in U.S. Pat. No. 4,369,115 discloses a safe method for mixing pure oxygen, or an oxygen enriched gas, at high pressure, with waste liquor in a wet oxidation system, such that intermittent drying conditions are avoided, preventing possible spontaneous combustion, fire or explosion. The oxygen is added to pure liquid water before it is mixed with the waste liquor.

Bauer et al. in U.S. Pat. No. 4,384,959 describe a continuous wet oxidation process using oxygen or oxygen enriched gas. An inert diluent gas is injected into the aqueous liquor or reactor off-gas such that oxygen in the gas phase is diluted by the sum of generated water vapor, produced carbon dioxide and injected inert gas to a concentration less than required for spontaneous combustion at every location in the system having surfaces not continually exposed to continuous liquid water phase.

Chowdhury et al. in U.S Pat. No. 4,395,339 describe a method of operation for pure oxygen wet oxidation systems where potential for oxidation is established prior to introducing oxygen and maintained until after oxygen flow is stopped. An inert gas, either from an external source or generated in situ, is present in the reactor from before oxygen flow is introduced until after oxygen flow is stopped, and the oxygen introducing means is clean for oxygen use from prior to the introduction of oxygen flow until after the oxygen flow is stopped.

Applicants have devised a startup procedure for wet oxidation systems using essentially pure oxygen gas for the oxidation of concentrated wastewaters which provides safe and controlled operation of the system.

SUMMARY OF THE INVENTION

The invention is a process for the safe and controlled startup of a high oxygen content gas wet oxidation system for treating a concentrated wastewater, where pressurized liquid and gaseous phases are mixed and heated, flow though a reactor vessel, are cooled, depressurized and then separated into an oxidized liquid phase effluent and a noncondensed offgas phase, comprising the steps;

(a) establishing a flow of startup water and air through said wet oxidation system at a first elevated operating temperature and a selected elevated system pressure;

(b) commencing a fractional flow of wastewater and a fractional flow of high oxygen content gas to said system to initiate wet oxidation;

(c) increasing in an increment the flow of wastewater and the flow of high oxygen content gas to said system while simultaneously decreasing in an increment the flow of startup water and the flow of air to said system to produce an incremental increase in said system operating temperature and to maintain offgas phase residual oxygen concentration within a selected value range; and (d) repeating step (c) until said flow of startup water and said flow of air to said system decrease to zero and said flow of wastewater and said flow of high oxygen content gas to said system increase to about 100 percent of selected operating flows, and said wet oxidation system attains a second selected elevated operating temperature, greater than said first elevated operating temperature, while maintaining said offgas phase residual oxygen concentration within said selected value range.

In an alternative embodiment of the invention the flow of startup water through the system is decreased to a selected nonzero value allowing concentrated liquid waste to be injected into the reactor vessel or any point upstream of the reactor vessel.

BRIEF DESCRIPTION OF THE DRAWING

The FIGURE is a flow diagram of a wet oxidation system showing several possible embodiments of the invention.

DESCRIPTION OF THE PREFERRED EMBODIMENTS

Referring to the FIGURE, the system is described for wet oxidation of a concentrated wastewater, with a COD in excess of about 10 g/l using essentially pure oxygen gas in the process. Essentially pure oxygen is defined as a gas containing at least 80 percent oxygen by volume. Preferably the gas contains at least about 95% oxygen by volume. The gas used is also referred to as high oxygen content gas. The use of essentially pure oxygen reduces the overall pressure of the wet oxidation system at elevated temperatures since extraneous gases, such as nitrogen, need not be pressurized and carried through the system.

A clean water supply conduit to supplies water to a water pump 12 where the water is brought to system pressure in a conduit 14. Air from a compressor 16, also at system pressure, is supplied by a conduit is to a mixing conduit 20. The air/water mixture traverses a process heat exchange 22, another conduit 24, then a steam heater 26 which provides heat for startup purposes. The heated mixture flows through a conduit 28 to a reactor vessel 30. The heated air/water mixture leaves the top of the reactor vessel 30 via a conduit 32 and traverses the process heat exchanger 22 where it is cooled against incoming air/water mixture. The mixture flows via a conduit 34 to a cooler 36 for additional cooling, then through a pressure control valve 38 operated by a pressure controller 40 located on the reactor vessel 30. The pressure control valve 38 and controller 40 maintain a constant pressure within the wet oxidation system. The depressurized mixture then traverses a conduit 42 to a separator vessel 44 where liquid/gas separation occurs. The noncondensed gases exit the separator 44 via an upper conduit 46 controlled by a valve 48. The oxygen content of the gases are measured by an oxygen meter 5?. Numerous commercially available oxygen measuring instruments may be employed for this function. The liquid phase exits from the separator vessel 44 via a conduit 52 controlled by a valve 54.

The startup procedure for the wet oxidation system is as follows. An operating temperature and pressure are chosen for system steady state operation for a particular wastewater. Air and water flow through the system are established and brought to the chosen pressure as determined by the pressure controller 40 and pressure control valve 38. The temperature of the air/water mixture in the system is then raised to a selected value lower than the desired operating temperature by adding heat to the system with the steam heater 26.

At this point in the startup, concentrated wastewater from a supply conduit 56 to a feed pump 58 is added at a fraction of the desired operating flow into the mixing conduit 20 via a feed conduit 60. Simultaneously high Oxygen content gas from an oxygen gas source 62 is added at a fraction of the desired operating flow to the mixing conduit 20 via an oxygen conduit 64. This initiates wet oxidation in the system. Next, wastewater flow is increased in an increment to the mixing conduit 20 via the feed conduit 60, while the flow of olean water from the water pump 12 is decreased by approximately an equal increment. Similarly, an incremental decrease in the flow of air from the compressor 16 occurs and the flow of high oxygen content gas from the oxygen gas source 62 increases in an increment to the mixing conduit 20 via the oxygen conduit 64. A small flow of water through the oxygen conduit 64 from a clean water source 66 prevents waste from flowing into the oxygen conduit 64 causing unsafe operation. This small flow of clean water may optionally be compensated for by a slightly larger decrease in the flow of clean water from the water pump 12 compared to the increase in wastewater flow from the wastewater pump 58.

As the wastewater and oxygen from both air and high oxygen content gas sources traverse the system to the reactor vessel 30, wet oxidation commences and heat is generated. The reactor vessel 30 provides the residence time for the system wherein the bulk of the wet oxidation reaction occurs. The incremental addition of wastewater and high oxygen content gas raises the system temperature in a controlled fashion. After a short time the flow of wastewater from the pump 58 and high oxygen content gas from the oxygen source 62 again are incrementally increased and the flow of water and air decreased in like increments, again raising the system operating temperature in a controlled fashion. The incremental changes are continued until the flow of wastewater and high oxygen content gas have reached about 100 percent of selected operating flows, the air and clean water flows have decreased to zero and the system temperature has reached the selected operating value. The system operating pressure is maintained at the chosen value. For safety purposes, the small flow of clean water through the oxygen supply conduit 64 continues all the time high oxygen content gas is flowing through that conduit.

Attempting to switch the wet oxidation system directly from clean water to 100% concentrated waste and from air to 100% high oxygen content gas is an extremely difficult and possibly dangerous procedure. One would be required to select precisely the correct waste and oxygen gas flow rates to produce the desired operating temperature and maintain sufficient offgas oxygen concentration to prevent fouling or corrosion to the system. Further, the kinetics of the wet oxidation reaction for a waste require a certain time interval to come to steady state at chosen waste and oxygen gas flow rates. Thus, when attempting a direct 100% switch, temperature control and offgas oxygen content would fluctuate widely before achieving steady state conditions, even if the precise flow rates were chosen.

The incremental changes in flow for the liquids and gases through the wet oxidation system can be adjusted for each particular situation. Generally, the greater the difference between the temperature at which wastewater and high oxygen content gas addition commences and the selected operating temperature, the smaller the incremental changes required to maintain system control. Increments of 33% for each change, that is three increments to attain 100% wastewater and high oxygen content gas flow, may work well for a modest change in operating temperature. Increments of 20% or 10% (five to ten increments) may be required for a large change in operating temperature. The final selected operating temperature is generally in the range of about 250° C. to about 373° C.

The incremental changes in air and high oxygen content gas flows are also made so as to maintain the residual oxygen gas concentration in the offgases within a selected value range. The residual oxygen concentration may be as low as 2 to 3 percent by volume or as high as 30 to 35 percent by volume, depending on the characteristics of the wastewater treated. There are situations where a 5 to 10 percent oxygen gas residual concentration is required to prevent corrosion of the materials of construction of the wet oxidation system.

In an alternative embodiment, the flow of clean water is decreased only to a limited fraction of the starting flow and highly concentrated wastewater is added to the system at any point as far downstream as the reactor vessel 30. Alternative points of addition for the wastewater are shown as 60' and 60". In this embodiment the partial flow of clean water from the water pump 12 is required to dilute the concentrated wastewater and provide sufficient liquid water for evaporative cooling and heat removal from the reactor vessel 30. The flow of clean water is also required to traverse the process heat exchanger 22 and recover the heat from the hot oxidized effluent leaving the system where the point of waste injection is beyond the process heat exchanger 22.

High oxygen content gas addition points may be varied as well, depending on the characteristics of the particular wastewater treated by the system. These points are denoted as 64' and 64". A wastewater which fouls heat exchangers when heated with limited oxygen would dictate that the high oxygen gas content be added upstream of the wastewater point of addition. Other wastewaters become extremely corrosive when heated in the absence of dissolved oxygen, thus dictating the addition of high oxygen content gas to the wastewater upstream of any heating device. Certain wastes which are difficult to dissolve, slurry or suspend in water can be injected directly into the reactor vessel. In this situation the high oxygen content gas may be added directly to the reactor vessel 30 or at any point upstream of the reactor vessel.

From the foregoing description, one skilled in the art can easily ascertain the essential characteristics of the invention and, without departing from the spirit and scope thereof, make various changes and modifications to adapt it to various usages.

We claim:

1. A process for the safe and controlled startup of a high oxygen content gas wet oxidation system for treating a concentrated wastewater, where pressurized liquid and gaseous phases are mixed and heated, flow though a reactor vessel, are cooled, depressurized and then separated into an oxidized liquid phase effluent and a noncondensed offgas phase, comprising the steps;
   (a) establishing a flow of startup water and air through said wet oxidation system at a first elevated operating temperature and a selected elevated system pressure;
   (b) commencing a fractional flow of wastewater and a fractional flow of high oxygen content gas to said system to initiate wet oxidation;
   (c) increasing in an increment the flow of wastewater and the flow of high oxygen content gas to said system while simultaneously decreasing in an increment the flow of startup water and the flow of air to said system to produce an incremental increase in said system operating temperature and to maintain offgas phase residual oxygen concentration within a selected value range; and
   (d) repeating step (c) until said flow of startup water and said flow of air to said system decrease to zero and said flow of wastewater and said flow of high oxygen content gas to said system increase to about 100 percent of selected operating flows, and said wet oxidation system attains a second selected elevated operating temperature, greater than said first elevated operating temperature, while maintaining said offgas phase residual oxygen concentration within said selected value range.

2. A process according to claim 1 wherein said wastewater has a Chemical Oxygen Demand in excess of about 10 g/l.

3. A process according to claim 1 wherein said selected value range of offgas phase residual oxygen concentration is between about 2 percent and about 35 percent.

4. A process according to claim wherein said second selected elevated operating temperature is between about 250° C. and about 373° C.

5. A process according to claim 1 wherein said high oxygen content gas contains at least 80 percent oxygen by volume.

6. A process according to claim 1 wherein said high oxygen content gas contains at least 95 percent oxygen by volume.

7. A process for the safe and controlled startup of a high oxygen content gas wet oxidation system for treating a concentrated wastewater, where pressurized liquid and gaseous phases are mixed and heated, flow though a reactor vessel, are cooled, depressurized and then separated into an oxidized liquid phase effluent and a noncondensed offgas phase, comprising the steps;
   (a) establishing a flow of startup water and air through said wet oxidation system at a first elevated operating temperature and a selected elevated system pressure;
   (b) commencing a fractional flow of wastewater and a fractional flow of high oxygen content gas to said system to initiation wet oxidation;
   (c) increasing in an increment the flow of wastewater and the flow of high oxygen content gas to said system while simultaneously decreasing in an increment the flow of startup water and the flow of air to said system to produce an incremental increase in said system operating temperature and to maintain offgas phase residual oxygen concentration within a selected value range; and
   (d) repeating step (c) until said flow of startup water has decreased to a selected nonzero value, said flow of air to said system has decreased to zero and said flow of wastewater and said flow of high oxygen content gas to said system increase to about 100 percent of selected operating flows, and said wet oxidation system attains a second selected elevated operating temperature, greater than said first elevated operating temperature, while maintaining said offgas phase residual oxygen concentration within said selected value range.

8. A process according to claim 7 wherein said wastewater has a Chemical Oxygen Demand in excess of about 10 g/l.

9. A process according to claim 7 wherein said selected value range of offgas phase residual oxygen concentration is between about 2 percent and about 35 percent.

10. A process according to claim 7 wherein said second selected elevated operating temperature is between about 250° C. and about 373° C.

11. A process according to claim 7 wherein said high oxygen content gas contains at least 80 percent oxygen by volume.

12. A process according to claim 7 wherein said high oxygen content gas contains at least 95 percent oxygen by volume.

UNITED STATES PATENT AND TRADEMARK OFFICE
CERTIFICATE OF CORRECTION

PATENT NO.   : 5,234,607
DATED        : August 10, 1993
INVENTOR(S)  : Bruce L. Brandenburg et al.

It is certified that error appears in the above-identified patent and that said Letters Patent is hereby corrected as shown below:

Cover page, [57] ABSTRACT, last line, "offgases" should read -- offgas --.
Column 1, lines 22 and 23, "KPa" should read -- kPa --, each occurrence.
Column 3, line 9, "conduit to" should read -- conduit 10 --.
Column 3, line 12, "conduit is" should read -- conduit 18 --.
Column 3, line 31, "5?" should read -- 50 --.
Column 3, line 49, "Oxygen" should read -- oxygen --.
Column 3, line 55, "olean" should read -- clean --.
Column 4, line 56, "offgases" should read -- offgas --.
Column 5, line 1, "as 60'" should read -- as conduits 60' --.
Column 5, line 14, "as 64'" should read -- as conduits 64' --.

Signed and Sealed this

Twenty-sixth Day of April, 1994

Attest:

BRUCE LEHMAN

*Attesting Officer*          *Commissioner of Patents and Trademarks*